United States Patent
Takehara et al.

(10) Patent No.: US 10,436,285 B2
(45) Date of Patent: Oct. 8, 2019

(54) TRANSMISSION BELT, FIBER MEMBER THEREFOR, AND MANUFACTURING METHOD FOR FIBER MEMBER

(71) Applicant: Mitsuboshi Belting Ltd., Kobe-shi, Hyogo (JP)

(72) Inventors: Tsuyoshi Takehara, Kobe (JP); Manabu Mitsutomi, Kobe (JP); Yoshihito Noborikawa, Kobe (JP); Yusuke Suzumegano, Kobe (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days.

(21) Appl. No.: 14/392,152

(22) PCT Filed: Jun. 25, 2014

(86) PCT No.: PCT/JP2014/066901
§ 371 (c)(1),
(2) Date: Dec. 23, 2015

(87) PCT Pub. No.: WO2014/208628
PCT Pub. Date: Dec. 31, 2014

(65) Prior Publication Data
US 2016/0273616 A1    Sep. 22, 2016

(30) Foreign Application Priority Data

Jun. 27, 2013  (JP) ................... 2013-135464
Mar. 25, 2014  (JP) ................... 2014-062332
Jun. 19, 2014  (JP) ................... 2014-125910

(51) Int. Cl.
*F16G 5/08*     (2006.01)
*F16G 1/10*     (2006.01)
(Continued)

(52) U.S. Cl.
CPC ............ *F16G 5/08* (2013.01); *B29D 29/103* (2013.01); *F16G 1/00* (2013.01); *F16G 1/08* (2013.01);
(Continued)

(58) Field of Classification Search
CPC ...... B29D 29/103; D03D 1/0094; F16G 5/08; F16G 5/20; F16G 1/10
See application file for complete search history.

(56) References Cited

U.S. PATENT DOCUMENTS 5,254,050 A * 10/1993  Nakajima ............ F16G 5/20
                                                      474/260
6,294,600 B1 * 9/2001  Takada .................. C08K 5/14
                                                      524/105
(Continued)

FOREIGN PATENT DOCUMENTS

JP    2001-289284 A    10/2001
JP    2008-185162 A    8/2008
(Continued)

OTHER PUBLICATIONS

Dow Chemical Company, Dow Surfactants Reference Chart, Mar. 2014, pp. 2-9. (Year: 2014).*

(Continued)

*Primary Examiner* — Michael R Mansen
*Assistant Examiner* — Robert T Reese
(74) *Attorney, Agent, or Firm* — Banner & Witcoff, Ltd.

(57) ABSTRACT

The present invention relates to a power transmission belt containing a frictional power transmission part and a fiber member that covers a surface of the frictional power transmission part, in which the fiber member is formed of a fiber (A) containing a water-absorbent fiber (A1) and contains a surfactant, to a fiber member used in the power transmission belt, and to a method for manufacturing the fiber member.

20 Claims, 3 Drawing Sheets

(51) Int. Cl.
*B29D 29/10* (2006.01)
*F16G 5/20* (2006.01)
*F16G 1/00* (2006.01)
*F16G 1/08* (2006.01)
*F16G 1/28* (2006.01)
*F16G 5/00* (2006.01)

(52) U.S. Cl.
CPC ............... *F16G 1/10* (2013.01); *F16G 1/28* (2013.01); *F16G 5/00* (2013.01); *F16G 5/20* (2013.01)

(56) References Cited

U.S. PATENT DOCUMENTS

| | | | |
|---|---|---|---|
| 6,689,005 B2 | 2/2004 | Hasaka et al. | |
| 2001/0029216 A1 | 10/2001 | Hayashi | |
| 2002/0039947 A1 | 4/2002 | Hasaka et al. | |
| 2007/0060431 A1* | 3/2007 | Hineno | F16G 5/20 474/263 |
| 2007/0249451 A1* | 10/2007 | Wu | F16G 1/28 474/263 |
| 2009/0298633 A1* | 12/2009 | Hineno | F16G 5/06 474/263 |
| 2010/0167860 A1 | 7/2010 | Mori et al. | |
| 2010/0173740 A1 | 7/2010 | Mori et al. | |
| 2014/0135161 A1 | 5/2014 | Mori et al. | |
| 2014/0364262 A1 | 12/2014 | Mori et al. | |
| 2015/0024892 A1* | 1/2015 | Hineno | F16G 1/10 474/237 |
| 2015/0276017 A1* | 10/2015 | Okamoto | F16G 5/20 474/238 |
| 2015/0285335 A1* | 10/2015 | Mitsutomi | F16G 5/20 474/238 |
| 2016/0053851 A1* | 2/2016 | Kojima | F16G 5/20 474/265 |

FOREIGN PATENT DOCUMENTS

| | | |
|---|---|---|
| JP | 2009-250293 A | 10/2009 |
| JP | 2010-539394 A | 12/2010 |
| JP | 2012-045895 A | 3/2012 |
| JP | 2013-096488 A | 5/2013 |
| WO | 2009/034748 A1 | 3/2009 |

OTHER PUBLICATIONS

Jul. 26, 2016—(CN) Notification of First Office Action—App 201480037099.0.
Sep. 16, 2014—International Search Report—Intl App PCT/JP2014/066901.
Jan. 5, 2017—(EP) Extended Search Report—App 14817095.4.
Nov. 8, 2016—(JP) Notification of Reasons for Refusal—App 2014-125910.
Mar. 2, 2017—(CN) Decision of Rejection—App 201480037099.0—Eng Tran.
"Pulping and Papermaking Additives and Application Technology Thereof," p. 180, edited by Yishan Liu, published in 2010—with Eng Tran.
Apr. 26, 2018—(CN) Notification of Reexamination—App 201480037099.0—Eng Tran.
Oct. 17, 2018—(CN) Notification of Reexamination—App 201480037099.0 and Eng Tran.
Mar. 5, 2019—(CN) Decision of Reexamination—App 201480037099.0—Eng Tran.
Jul. 16, 2019—(EP) Office Action—App 14817095.4.

* cited by examiner

TRANSMISSION BELT, FIBER MEMBER THEREFOR, AND MANUFACTURING METHOD FOR FIBER MEMBER

CROSS REFERENCE TO RELATED APPLICATIONS

This is a U.S. National Phase Application under 35 U.S.C. § 371 of International Application No. PCT/JP2014/066901, filed Jun. 25, 2014, which claims priority to Japanese Application Nos. 2013-135464 filed Jun. 27, 2013, 2014-062332 filed Mar. 25, 2014 and 2014-125910, filed Jun. 19, 2013, the entire disclosures of which are incorporated herein by reference.

TECHNICAL FIELD

The present invention relates to a power transmission belt (belt for power transmission), a fiber member to be used for the power transmission belt, and a method for manufacturing the fiber member, more specifically, it relates to a power transmission belt capable of improving quietness (or silence or noise generation resistance, particularly quietness at a watered state), a fiber member to be used for the power transmission belt, and a method for manufacturing the fiber member.

BACKGROUND ART

In the field of the rubber industry, particularly in automotive components, advanced high function and high performance are desired. As one of rubber products used in such automotive components, there is a power transmission belt (belt for power transmission) such as a frictional power transmission belt, and the frictional power transmission belt has been widely used, for example, for power transmission of auxiliary drive of automotive air compressors, alternators, or the like. As such a type of belt, for example, there is known a V-ribbed belt in which ribs are provided along a belt longitudinal direction.

In such a power transmission belt, there is a problem that noise is generated at the time of exposure to water. For example, in rainy weather running or the like, in the case where water enters the engine compartment and the water infiltrates between a frictional power transmission surface (power transmission surface) of the belt and a pulley, since the frictional power transmission surface is poor in wettability with water and is likely to repel water, a water-infiltrated state between the belt and the pulley at the time of exposure to water does not become uniform. At a portion where the water does not infiltrate, the friction coefficient is not lowered and the belt is in a state of close contact with the pulley, but at a portion where water infiltrates, the friction coefficient is lowered. When portions in a dry state (DRY) and in a water-exposed state (WET) are mixed on the frictional power transmission surface and a difference in the friction coefficients of the both is large, generation of stick-slip noise between the belt and the pulley is likely to occur.

In recent years, in such a power transmission belt, there is an increasing demand for excellent quietness (quietness at the time of dryness (DRY) and at the time of pouring water (at the time of exposure to water, WET)), and several attempts have been made.

For example, Patent Document 1 discloses a frictional power transmission belt in which at least a frictional power transmission surface is composed of a rubber composition obtained by blending from 1 to 25 parts by weight of a surfactant with 10 parts by weight of an ethylene-α-olefin elastomer. In the frictional power transmission belt of Patent Document 1, the affinity of the rubber (ethylene-α-olefin elastomer) that forms the frictional power transmission surface to water can be increased by blending the surfactant and thus the noise owing to rubbing such as misalignment can be reduced to improve silence. However, since a water film is continuously formed between the frictional power transmission surface and the pulley, the belt is still in a slippery condition, so that it cannot be said that the power transmission performance at the time of exposure to water is sufficient. Moreover, in the belt, since the frictional power transmission surface is formed of a rubber composition, there is a problem that the rubber composition is abraded or deteriorated and thus the surface conditions of the frictional power transmission surface differ considerably in the initial stage of running and after long-term running. There is also a problem that rubber properties are deteriorated when the surfactant is contained in a large amount.

Patent Document 2 discloses a V-ribbed belt in which a rib surface is covered with a canvas that contains a cellulose-based fiber and is freely stretchable in a predetermined two directions. According to the description of Patent Document 2, there is discloses that since the rib surface is covered with a canvas, durability of the rib surface of the V-ribbed belt is improved and rib surface conditions can be maintained. However, in the V-ribbed belt of Patent Document 2, since the rubber is allowed to permeate from the canvas that covers the rib surface to be exposed on the frictional power transmission surface and thus the portion of the canvas exposed on the surface decreases, the friction coefficient in a dry state increases. Furthermore, though the canvas contains a cellulose-based fiber and thus shows water absorbability, it has low wettability. Therefore, the water film cannot be sufficiently (efficiently) absorbed over the whole frictional power transmission surface. Therefore, portions in a dry state and in a water-exposed state are mixed on the frictional power transmission surface and a difference in the friction coefficient between the both portions increases, so that there is a concern of noise generation.

PRIOR ART DOCUMENT

Patent Document

Patent Document 1: JP-A-2008-185162 (CLAIMS)
Patent Document 2: JP-T-2010-539394 (CLAIMS)

SUMMARY OF THE INVENTION

Problems that the Invention is to Solve

Accordingly, an object of the present invention is to provide a power transmission belt capable of enhancing or improving quietness (silence).

Another object of the present invention is to provide a power transmission belt capable of realizing excellent quietness without impairing power transmission performance.

Still another object of the present invention is to provide a power transmission belt capable of simultaneously achieving quietness, durability, and power transmission performance at high levels.

Another object of the present invention is to provide a fiber member useful for preparing the above-described excellent power transmission belt and a manufacturing method thereof.

Means for Solving the Problems

As a result of intensive studies for achieving the above objects, the present inventors have found that, in a power transmission belt having a frictional power transmission part (power transmission part), when the surface (frictional power transmission surface, power transmission surface) of the frictional power transmission part (or power transmission part) is covered with a specific fiber member (i.e., a specific fiber member (knitted fabric, etc.) that is formed of a specific fiber containing a water-absorbent fiber and contains a surfactant), quietness (particularly, quietness at the time of exposure to water or at the time of pouring water) can be improved or enhanced. Thus, they have accomplished the present invention.

That is, the power transmission belt according to the present invention is a power transmission belt containing a frictional power transmission part and a fiber member that covers a surface of the frictional power transmission part, in which the fiber member is formed of a fiber (A) containing a water-absorbent fiber (A1) and contains a surfactant. In other words, the power transmission belt according to the present invention is a power transmission belt containing a frictional power transmission part, in which the surface of the frictional power transmission part is covered with a fiber member that is formed of a fiber (A) containing a water-absorbent fiber (A1) and contains a surfactant. The frictional power transmission part means a portion capable of coming into contact with a pulley. Therefore, in such a power transmission belt, the frictional power transmission part (or a surface thereof, i.e., the frictional power transmission surface) is capable of coming into contact with a pulley via the fiber member.

In the fiber (A), the water-absorbent fiber (A1) may contain a cellulose-based fiber (a cotton fiber, etc.) in particular. The proportion of the water-absorbent fiber (A1) may be, for example, 1% by mass or more (e.g., 5% by mass or more), and may be 10% by mass or more in the entire fiber (A).

The fiber (A) may consist of the water-absorbent fiber (A1) alone, and may further contain a non-water-absorbent fiber (A2). Such a non-water-absorbent fiber (A2) may contain a stretchable fiber (polyurethane fiber, etc.) in particular. In the case of containing such a non-water-absorbent fiber (A2), the ratio of the water-absorbent fiber (A1) and the non-water-absorbent fiber (A2) may be, for example, the former/the latter (mass ratio)=about 99/1 to 5/95 (e.g., 95/5 to 10/90).

The fiber member may be a fabric member, and particularly may be a knitted fabric (e.g., a knitted fabric that is knitted by weft knitting).

In the fiber member, the surfactant may contain a nonionic surfactant (e.g., a polyethylene glycol-type nonionic surfactant). The content of the surfactant may be from about 1 to 100 g per 1 $m^2$ of the fiber member (fiber member formed of the fiber (A)). The content (or attached ratio) of the surfactant may be from about 0.5 to 120 parts by mass, relative to 100 parts by mass of the fibers (A) that forms the fiber member (fiber member before introducing the surfactant).

In the power transmission belt according to the present invention, the frictional power transmission part (or the frictional power transmission surface) may be formed of a rubber (or a rubber composition).

The power transmission belt according to the present invention may be, for example, a power transmission belt containing a tension layer that forms a belt back face, a compression layer (particularly, compression rubber layer) formed on one side of the tension layer, and a tension member embedded along a belt longitudinal direction between the tension layer and the compression layer and the compression layer has the frictional power transmission part covered with the above-described fiber member. This power transmission belt may be a belt having the frictional power transmission part (ribs, etc.) formed on the compression layer, and may be a V-ribbed belt in particular.

In the power transmission belt according to the present invention, the contact angle (contact angle of water with respect to the surface of the frictional power transmission part) after a lapse of 5 seconds from dropwise addition of water onto the surface of the frictional power transmission part may be from about 0 to 30°.

The present invention also encompasses the above-described fiber member, that is, a fiber member for covering a surface of a frictional power transmission part (frictional power transmission part of a power transmission belt having a frictional power transmission part) constituting a power transmission belt, in which the fiber member is formed of a fiber (A) containing a water-absorbent fiber (A1) and contains a surfactant.

Such a fiber member may be manufactured by immersing the the fiber (A) (or a main body of the fiber member formed of the fiber (A)) containing the water-absorbent fiber (A1) in a solution containing the surfactant. In such a manufacturing method, the concentration of the surfactant in the solution may be, for example, from about 0.3 to 50% by mass.

Advantage of the Invention

According to the power transmission belt of the present invention, quietness (silence, noise generation resistance) can be enhanced or improved. In particular, in the power transmission belt of the invention, since a surfactant efficiently improves the wettability with water on a frictional power transmission surface by combining a water-absorbent fiber and the surfactant, water spreads on the frictional power transmission surface and efficient water absorption can be achieved by the water-absorbent fiber. Probably for the reasons, a difference in the friction coefficient between at the time of dryness (DRY) and at the time of exposure to water (WET) on the frictional power transmission surface (power transmission surface) can be reduced, so that an effect of improving quietness at the time of exposure to water is high.

Also, in the power transmission belt of the present invention, since the surface of the frictional power transmission part (frictional transmission surface) can be covered with a fiber member, the abrasion and deterioration of constitutional components (particularly a rubber) of the frictional power transmission part can be effectively suppressed and the durability of the belt can be increased. Moreover, by covering with the fiber member, it is also possible to suppress an excessive increase in the friction coefficient of the belt at the time of dryness. Furthermore, although it is covered with such a fiber member, the power transmission performance from the frictional power transmission part (power transmission part) is not impaired. In particular, since the friction coefficient is moderately stabilized both at the time of dryness and at the time of exposure to water, power transmission performance is excellent. Therefore, the power transmission belt of the present invention can simultaneously achieve quietness, durability, and power transmission performance at high levels and thus has very high usefulness.

MODES FOR CARRYING OUT THE INVENTION

The fiber member (surfactant-containing fiber member) of the present invention is formed of a specific fiber (A) and also contains a surfactant (or a surfactant is attached thereto). In other words, the fiber member contains a fiber (A) and a surfactant. Such a fiber member can be used, as mentioned later, as a fiber member for covering the surface (surface of the power transmission belt, which is capable of coming into contact (or comes into contact) with a pulley) of a frictional power transmission part constituting a power transmission belt (or laminating on the frictional power transmission part).
(Fiber Member)
The fiber member is formed of a fiber (A) and the fiber (A) contains at least a water-absorbent fiber (sometimes referred to as water-absorbent fiber (A1), fiber (A1), or the like).

Examples of the water-absorbent fiber (or a fiber containing a water-absorbing yarn) include polyvinyl alcohol fibers (polyvinyl alcohol, fibers of ethylene-vinyl alcohol copolymers, vinylon, etc.), cellulose-based fibers (cellulose fibers (cellulose fibers derived from plants, animals, bacteria, etc.), fibers of cellulose derivatives), and the like. Examples of the cellulose fibers include natural plant-derived cellulose fibers (pulp fibers) such as wood pulp (coniferous tree or broadleaf tree pulp, etc.), bamboo fibers, sugar cane fibers, seed hair fibers (cotton fibers (cotton linters), kapok, etc.), bast fibers (hemp, kouzo (paper mulberry), mitsumata (oriental paperbush), etc.), and leaf fibers (Manila hemp, New Zealand hemp, etc.); animal-derived celluloses such as sea squirts celluloses; bacterial cellulose fibers; algal celluloses, and the like. Examples of the fibers of cellulose derivatives include cellulose ester fibers; regenerated cellulose fibers (rayon, cupra, lyocell, etc.), and the like. Further, polyamide fibers (aliphatic polyamide fibers such as polyamide 6 fiber, polyamide 66 fiber, and polyamide 46 fiber, etc.), and animal-derived fibers (wool, silk, etc.) can also be used as the water-absorbent fibers.

Furthermore, the water-absorbent fiber may be a composite fiber in which at least a part or all of the surface of the core material or a core yarn is covered with a component of the water-absorbent fiber (water-absorbent fiber component). The core material or core yarn may be hydrophobic or non-water-absorbent and may be hydrophilic or water-absorbent. The core material or core yarn may be any of the fibers exemplified below, for example, non-water-absorbent fibers such as polyolefin fibers, acrylic fibers, polyester fibers, and polyurethane fibers.

The water-absorbent fibers may be used alone or in combination of two or more kinds thereof.

Of these water-absorbent fibers, cellulose-based fibers (cotton fiber, hemp, rayon, etc.) and regenerated cellulose fibers may be suitably used, and particularly, cotton fibers that are natural fibers excellent in water absorbability are preferred. Therefore, the water-absorbent fiber may contain at least a cellulose-based fiber (especially, cotton fiber) and/or a regenerated cellulose fiber.

The ratio of the water-absorbent fiber (A1) to the whole fiber (A) can be selected from the range of about 1% by mass or more (e.g., 3% by mass or more) and, for example, may be 5% by mass or more (e.g., 7% by mass or more), preferably 10% by mass or more (e.g., 12% by mass or more), more preferably 15% by mass or more (e.g., 17% by mass or more), particularly 20% by mass or more (e.g., 22% by mass or more), and particularly preferably 25% by mass or more (e.g., 27% by mass or more).

It is sufficient that the fiber (A) contains at least the water-absorbent fiber (A1), and it may further contain a non-water-absorbent fiber (other fiber, a fiber other than the water-absorbent fiber) (sometimes referred to as non-water-absorbent fiber (A2), fiber (A2)). When a non-water-absorbent fiber is used in combination, it is easy to realize high quietness (and power transmission performance) while enhancing or improving the durability of the belt (or the fiber member).

Examples of the non-water-absorbent fiber (or a fiber constituting a yarn (non-water absorbent yarn) that does not contain a water-absorbent yarn) include synthetic fibers such as polyolefin fibers (polyethylene fibers, polypropylene fibers, etc.), non-water-absorbent polyamide fibers (aromatic polyamide fibers such as aramid fiber, etc.), acrylic fibers, polyester fibers ($C_{2-4}$-alkylene-$C_{6-14}$-arylate-based fibers such as polyethylene terephthalate (PET) fibers, polypropylene terephthalate (PPT) fibers, polytrimethylene terephthalate (PTT) fibers, and polyethylene naphthalate (PEN) fibers, polyarylate-based fibers, etc.), polyparaphenylene benzobisoxazole (PBO) fibers, and polyurethane fibers; and inorganic fibers such as carbon fibers.

The non-water-absorbent fibers may be used alone or in combination of two or more kinds thereof.

Of these, in particular, the non-water-absorbent fiber may contain a stretchable fiber (or an elastic yarn, a polyurethane fiber (or a polyurethane elastic yarn or spandex), etc.). Incidentally, the stretchable fiber (or elastic yarn) may be a fiber (or a yarn) to which stretchability is imparted by stretching (e.g., woolly processing, crimping, or the like).

Therefore, the non-water-absorbent fiber may contain at least a stretchable fiber. In the case where the non-water-absorbent fiber contains a stretchable fiber, the ratio of the stretchable fiber to the whole non-water-absorbent fiber may be, for example, 1% by mass or more (e.g., from 3 to 100% by mass), preferably 5% by mass or more (e.g., from 7 to 90% by mass), and more preferably 10% by mass or more (e.g., from 12 to 80% by mass).

The ratio of the water-absorbent fiber (A1) to the non-water-absorbent fiber (A2) can be selected from the range of the former/the latter (mass ratio)=about 99.5/0.5 to 3/97 (e.g., 99/1 to 5/95) and may be, for example, 99/1 to 5/95 (e.g., 98/2 to 8/92), preferably 98/2 to 10/90 (e.g., 97/3 to 12/88), more preferably 96/4 to 15/85 (e.g., 95/5 to 17/83), further preferably about 93/7 to 20/80 (e.g., 90/10 to 22/78), particularly preferably 95/5 to 10/90 (e.g., 88/12 to 25/75), and especially about 85/15 to 30/70.

The fibers (water-absorbent fiber, non-water-absorbent fiber) may typically be incorporated in the fiber member in the form of a yarn. The yarn may be a monofilament yarn or a multifilament yarn. The multifilament yarn may be a non-twisted yarn or may be a twisted yarn.

The twisted yarn may be a yarn (e.g., an organzine (piled yarn), Koma twist yarn or Lang lay yarn) obtained by using a plurality of single-direction twisted yarns as primary twisted yarn and by giving final twists thereto, or it may be a twisted yarn (e.g., corkscrew yarn) obtained by using a single-direction twisted yarn and a single yarn as primary twisted yarns and by giving final twists thereto.

The multifilament yarn (or twisted yarn) may be a composite yarn (or composite fiber) composed of two or more kinds of fibers (or yarns). Such a composite yarn (twisted yarn) may be a covering yarn (yarn (twisted yarn) containing a core yarn and a sheath yarn wound on (covering) the core yarn).

The multifilament yarn (or twisted yarn) may be configured with a water-absorbent fiber (water-absorbent fiber yarn, monofilament of the water-absorbent fiber) alone or a non-water-absorbent fiber (or a non-water-absorbent fiber yarn, e.g., the non-water-absorbent fiber described above (e.g., a stretchable fiber such as a polyurethane fiber)) alone, or may contain a water-absorbent fiber and a non-water-absorbent fiber.

Examples of the composite yarn containing a water-absorbent fiber include a composite yarn conjugated with two or more kinds of water-absorbent fibers, a composite yarn conjugated with a water-absorbent fiber and a non-water-absorbent fiber, and a covering yarn containing a water-absorbent fiber. Of these, from the viewpoint of stretchability, the covering yarn may be suitably used. As for the covering yarn containing a water-absorbent fiber, both of the core yarn and the sheath yarn may contain a water-absorbent fiber (water-absorbent fiber yarn) or either one (particularly, the sheath yarn) thereof may contain a water-absorbent fiber (cotton fiber, etc.) and the other (particularly, the core yarn) may contain a non-water-absorbent fiber (e.g., a stretchable fiber such as a polyurethane fiber). Typically, in many cases, as for the covering yarn containing a water-absorbent fiber, the core yarn is often configured with a non-water-absorbent fiber and the sheath yarn is often configured with a water-absorbent fiber.

Examples of the composite yarn containing non-water-absorbent fibers alone include a composite yarn containing two or more kinds of non-water-absorbent fibers (e.g., a composite yarn conjugated with two or more kinds of polyester fibers (e.g., a PET fiber and a PTT fiber), etc.), a covering yarn in which each of the core yarn and the sheath yarn is configured with a non-water-absorbent fiber (e.g., a yarn in which either one of the core yarn and the sheath yarn is configured with a stretchable fiber, i.e., a covering yarn in which the core yarn is configured with a stretchable fiber such as a polyurethane fiber and the sheath yarn is configured with a polyester fiber (a PET fiber, etc.)), and the like.

The fineness of the yarns (yams containing a water-absorbent fiber) depends on the embodiment of the fiber member but may be, for example, from 20 to 600 dtex, and preferably from about 50 to 300 dtex.

The fiber member of the present invention is formed of the fiber (A). Such a fiber member (form of the fiber member) is not particularly limited as long as it is a form capable of covering a frictional power transmission surface of a power transmission belt, but it may be typically a form of a fabric (or canvas) such as a knitted fabric, a woven fabric, or a nonwoven fabric.

Of these, in particular, in the present invention, a fiber member with a knitted fabric form is preferred. A knitted fabric is suitable since it is excellent in stretchability and is easily fitted to the contour (shape) of the frictional power transmission surface.

A knitted fabric is a fabric having a structure knitted by making a mesh (loop) with one or two or more knitting yarns and continuously making a new loop by hooking a next yarn to the loop. That is, the knitted fabric is formed by making loops without straightly crossing the yarn.

The knitted fabric (or knitting of the knitted fabric) may be either weft knitting (or a knitted fabric knitted by weft knitting) or warp knitting (or a knitted fabric knitted by warp knitting).

Examples of the well knitting (or a knitted structure by well knitting) include plain stitch (jersey stitch), rib stitch, Kanoko stitch (moss stitch), smooth stitch, and the like. Examples of warp knitting (or a knitted structure by warp knitting) include single denbigh, single code, tricot, half tricot, and the like.

Of these, weft knitting (or a knitted fabric knitted by weft knitting) is preferred and particularly, plain stitch or seed stitch (weft knitting having a knitted structure obtained by plain stitch or seed stitch) is preferred.

The fiber (A) can be appropriately used suitably depending on the form of the fiber member. For example, in the case where the fiber (A) is configured with a water-absorbent fiber alone, a fiber member of the above form (e.g., a knitted fabric) can be formed of the water-absorbent fiber or a yarn thereof.

In the case where the fiber (A) contains a non-water-absorbent fiber, for example, (i) a fiber member (knitted fabric, etc.) may be formed by using a water-absorbent fiber alone (or a yarn containing the water-absorbent fiber alone) and a non-water-absorbent fiber alone (or a yarn containing the non-water-absorbent fiber alone), (ii) a fiber member may be formed by using a yarn containing a water-absorbent fiber and a non-water-absorbent fiber (e.g., a twisted yarn such as a covering yarn), or (iii) a fiber member may be formed by using a yarn containing a water-absorbent fiber and a non-water-absorbent fiber and a yarn containing a water-absorbent fiber alone and/or a yarn containing a non-water-absorbent fiber alone.

The fiber member (or fiber member before a surfactant is attached or incorporated thereto) may be subjected to an adhesive treatment as required. There is a case where the adhesiveness to the frictional power transmission surface (or compression layer to be mentioned below) can be enhanced or improved by the adhesive treatment. Also, the abrasion resistance of the frictional power transmission surface (power transmission surface) can be enhanced. Examples of such an adhesive treatment include an immersion treatment into a resin-based treating solution obtained by dissolving an adhesive component (e.g., an epoxy compound or an isocyanate compound) in an organic solvent (toluene, xylene, methyl ethyl ketone, etc.), an immersion treatment into a resorcin-formalin-latex solution (RFL solution), and an immersion treatment into a gum obtained by dissolving a rubber composition into an organic solvent. As the other methods for the adhesive treatment, for example, a friction treatment in which the fiber member and a rubber composition are allowed to pass through a calender roll to print the rubber composition into the fiber member, a spreading treatment of applying a gum to the fiber member, a coating treatment of laminating a rubber composition on the fiber member, and the like can be also adopted.

The basis weight of the fiber member may be, for example, from 50 to 500 g/m², preferably from 80 to 400 g/m², and further preferably from about 100 to 350 g/m².

The thickness (average thickness) of the fiber member may be, for example, from 0.1 to 3 mm, preferably from 0.2 to 2 mm, and more preferably from about 0.3 to 1 mm.

The fiber member of the present invention is formed of a specific fiber (A) as described above and contains a surfactant. In other words, the fiber member of the present invention contains a main body formed of the fiber (A) (hereinafter sometimes referred to as "fiber member main body" or "main body") and a surfactant. In such a fiber member, the form of incorporation of the surfactant is not particularly limited, but in many cases, the surfactant is attached to the fiber member (the fiber (A) forming the fiber member or the main body). That is, in many cases, the fiber member contains a main body formed of the fiber (A) and a surfactant attached to the main body (or the fiber (A) forming the main body).

A surfactant is a generic term for substances which have a hydrophilic portion (hydrophilic group) having affinity to water and a hydrophobic portion (hydrophobic group, lipophilic group) having affinity to an oil in the molecule and has an action of homogeneously mixing a polar substance with a non-polar substance, and in addition, it has effects of reducing surface tension to enhance wettability and decreasing the friction of an interface through the intervention of the surfactant between a substance and another substance.

In the present invention, when a surfactant is incorporated into the fiber member and a water-absorbent fiber is combined with the surfactant, the surfactant reduces the surface tension of water droplets attached on a frictional power transmission surface to enhance wettability with water and the water spreads on the frictional power transmission surface. Thus, water absorption with the water-absorbent fiber can be efficiently achieved.

The surfactant is not particularly limited and an ionic surfactant, a nonionic surfactant, and the like can be used. The nonionic surfactant may be a polyethylene glycol-type (polyoxyethylene-type) nonionic surfactant or a polyhydric alcohol-type nonionic surfactant.

The polyethylene glycol-type nonionic surfactant is a nonionic surfactant in which to a hydrophobic base component having a hydrophobic group, such as a higher alcohol, an alkylphenol, a higher fatty acid, a polyhydric alcohol higher fatty acid ester, a higher fatty acid amide, or a polypropylene glycol is added ethylene oxide to impart a hydrophilic group.

Examples of the higher alcohol as the hydrophobic base component include $C_{10-30}$ saturated alcohols such as lauryl alcohol, tridecyl alcohol, tetradecyl alcohol, cetyl alcohol, octadecyl alcohol, and aralkyl alcohols, $C_{10-26}$ unsaturated alcohols such as oleyl alcohol, and the like. Examples of the alkylphenol include $C_{4-16}$ alkylphenols such as octylphenol and nonylphenol, and the like.

Examples of the higher fatty acid as the hydrophobic base component include saturated fatty acids (e.g., $C_{10-30}$ saturated fatty acids such as myristic acid, palmitic acid, stearic acid, arachidic acid, behenic acid, lignoceric acid, cerotic acid, and montanic acid, preferably $C_{12-28}$ saturated fatty acids, more preferably $C_{14-26}$ saturated fatty acids, and especially $C_{16-22}$ saturated fatty acids, and the like; and oxycarboxylic acids such as hydroxystearic acid; and the like), unsaturated fatty acids (e.g., $C_{10-30}$ unsaturated fatty acids such as oleic acid, erucic acid, erucic acid , linoleic acid, linolenic acid, and eleostearic acid, and the like). These higher fatty acids may be used alone or in combination of two or more kinds thereof.

The polyhydric alcohol higher fatty acid ester is an ester of a polyhydric alcohol with the above-described higher fatty acid and has an unreacted hydroxyl group. Examples of the polyhydric alcohol include alkanediols ($C_{2-10}$ alkanediols such as ethylene glycol, propylene glycol, and butanediol, etc.), alkanetriols (glycerin, trimethylolethane, trimethylolpropane, etc.), alkanetetraols (pentaerythritol, diglycerin, etc.), alkanehexaols (dipentaerythritol, sorbitol, sorbit, etc.), alkaneoctaols (sucrose, etc.), alkylene oxide adducts thereof ($C_{2-4}$ alkylene oxide adducts, etc.), and the like.

In the following, when "oxyethylene", "ethylene oxide" or "ethylene glycol" is represented by "EO", "oxypropylene", "propylene oxide" or "propylene glycol" is represented by "PO", specific examples of the polyethylene glycol-type nonionic surfactant include polyEO higher alcohol ethers (polyEO $C_{10-26}$ alkyl ethers such as polyEO lauryl ether and polyEO stearyl ether), polyEO polyPO higher alcohol ethers (e.g., polyEO polyPO $C_{10-26}$ alkyl ethers); alkylphenol-EO adducts such as poly EO octylphenyl ether and polyEO nonylphenyl ether; fatty acid-EO adducts such as polyEO monolaurate, polyEO monooleate, and polyEO monostearate; glycerin mono- or di-higher fatty acid ester-EO adducts (EO adducts of glycerin mono- or di-$C_{10-26}$ fatty acid esters such as glycerin mono- or dilaurate, glycerin mono- or dipalmitate, glycerin mono- or distearate, and glycerin mono- or diolate), pentaerythritol higher fatty acid ester-EO adducts (pentaerythritol mono- to tri-$C_{10-26}$ fatty acid ester-EO adducts such as pentaerythritol distearate-EO adduct, etc.), dipentaerythritol higher fatty acid ester-EO adducts, sorbitol higher fatty acid ester-EO adducts, sorbit higher fatty acid ester-EO adducts, sorbitan fatty acid ester-EO adducts such as polyEO sorbitan monolaurate, polyEO sorbitan monostearate, and polyEO sorbitan tristearate, polyhydric alcohol fatty acid ester-EO adducts such as sucrose higher fatty acid ester-EO adducts; higher alkylamine-EO adducts such as polyEO laurylamino ether and polyEO stearylamino ether; fatty acid amide-EO adducts such as polyEO coconut fatty acid monoethanolamide, polyEO lauric acid monoethanolamide, polyEO stearic acid monoethanolamide, and polyEO oleic acid monoethanolamide; oil and fat-EO adducts such as polyEO castor oil and polyEO hardened castor oil; polyPO-EO adducts (polyEO-polyPO block copolymers, etc.), and the like. These polyethylene glycol-type nonionic surfactants may be used alone or in combination of two or more kinds thereof.

The polyhydric alcohol-type nonionic surfactant is a nonionic surfactant in which a hydrophobic group such as a higher fatty acid is bonded to the above-described polyhydric alcohol (especially, alkanetriol to alkanehexaol such as glycerol, diglycerin, pentaerythritol, sucrose, or sorbitol). Examples of the polyhydric alcohol-type nonionic surfactant include glycerin fatty acid esters such as glycerin monostearate and glycerol monooleate, pentaerythritol fatty acid esters such as pentaerythritol monostearate and pentaerythritol di-tallowate esters, sorbitan fatty acid esters such as sorbitan monolaurate and sorbitan monostearate, sorbitol fatty acid esters such as sorbitol monostearate, sucrose fatty acid esters, alkyl ethers of polyhydric alcohols, fatty acid amides of alkanolamines such as coconut fatty acid diethanolamide, alkyl polyglycosides, and the like. These polyhydric alcohol-type nonionic surfactants may also be used alone or in combination of two or more kinds thereof, and may be used in combination with the polyethylene glycol-type nonionic surfactants.

The ionic surfactants may be anionic surfactants such as sulfonic acid salts (alkylbenzenesulfonic acid salts, α-olefinsulfonic acid salts, alkanesulfonic acid salts, etc.), sulfuric acid salts (alkyl sulfuric acid salts, polyEO alkyl ether sulfuric acid ester salts, etc.), long-chain fatty acid salts, naphthalenesulfonic acid formalin condensates, phosphoric acid salts (aliphatic phosphoric acid esters, aromatic phosphoric acid esters, alkyl phosphoric acid salts, etc.), and sulfosuccinic acid ester salts, cationic surfactants such as alkyltrimethylammonium salts and dialkyldimethylammonium salts, amphoteric surfactants such as alkyl betaines and imidazoline derivatives, and the like.

Preferred surfactants are nonionic surfactants, in particular, polyethylene glycol-type nonionic surfactants. Therefore, the surfactant may contain at least a nonionic surfactant (in particular, a polyethylene glycol-type nonionic surfactant).

The degree of affinity of a surfactant to water and oil can be indicated by an HLB (Hydrophile-Lipophile-Balance) value. HLB of surfactants is in the range of from 0 to 20, and lipophilicity is high when the value is close to 0 and hydrophilicity increases as the value approaches to 20. The HLB value of the surfactant is not particularly limited, but it may be from about 5 to 15, and especially may be from about 7 to 15.

When the HLB value is controlled to the above-mentioned range, it is easy to incorporate (or attach) the surfactant into (or to) the fiber member efficiently.

Furthermore, the boiling point of the surfactant is not particularly limited, and a surfactant having a higher boiling point than the vulcanization temperature of the rubber to be described later can be also used.

The melting point of the surfactant is preferably low and the lower limit is not particularly limited. The melting point of the surfactant is preferably room temperature or lower and is, for example, 20° C. or lower (e.g., from −40° C. to 20° C.), preferably from −35° C. to 15° C. (e.g., from −30° C. 10° C.), more preferably from about -35° C. to 5° C. and usually, may be about 0° C. or lower (e.g., from −35° C. to −5° C.). The surfactant may be, usually, liquid at room temperature (20 to 25° C.). When the melting point is controlled to the above-mentioned range, it is easy to incorporate (or attach) the surfactant into (or to) the fiber member efficiently.

In the fiber member of the present invention, the content (or attached ratio) of the surfactant can be, for example, selected from the range of, per 1 m$^2$ of the fiber member (or one surface of the fiber member), 0.1 g or more (e.g., from 0.3 to 300 g), may be, for example, from 0.5 to 200 g (e.g., from 0.7 to 150 g), preferably from 1 to 100 g (e.g., from 1.2 to 90 g), and more preferably from about 1.5 to 80 g (e.g., from 2 to 70 g), and may be especially 3 g or more (e.g., 5 g or more (e.g., from 6 to 100 g), preferably 8 g or more (e.g., from 9 to 80 g), and further preferably 10 g or more (e.g., from 12 to 60 g)). When the content is controlled as such, it is easy to realize excellent quietness efficiently. Although the upper limit of the content of the surfactant is not particularly limited, the content may be appropriately selected within a range capable of suppressing stickiness of the surfactant in the fiber member.

The content of the surfactant can be selected from the same range as described above also in the power transmission belt of the present invention but, as described below, in the case where vulcanization is performed after covering with the fiber member, there is a case where a part of the surfactant is vaporized. In such a case, it may be incorporated into the fiber member so that the content after vaporization falls within the above range, assuming the amount of vaporization beforehand.

The content (attached ratio) of the surfactant may be, for example, relative to 100 parts by mass of the fibers (A) that forms the fiber member (or the main body of the fiber member), from 0.3 to 150 parts by mass (e.g., from 0.5 to 120 parts by mass), preferably from 0.7 to 100 parts by mass (e.g., from 1 to 80 parts by mass), more preferably from 2 to 70 parts by mass (e.g., from 3 to 60 parts by mass), and particularly from about 5 to 50 parts by mass (e.g., from 7 to 40 parts by mass) and usually, may be from about 3 to 80 parts by mass (e.g., from 5 to 70 parts by mass, preferably from 8 to 50 parts by mass).

The method for manufacturing the fiber member (fiber member containing a surfactant) of the present invention (i.e., a method of incorporating (or attaching) the surfactant into (or to) the main body (or the fiber (A)) of the fiber member) is not particularly limited and includes a method of spraying the surfactant to the main body (or the fiber (A)) of the fiber member which is formed of the fiber (A) containing a water-absorbent fiber (A1), a method of coating the surfactant, a method of immersion in the surfactant, and the like. In the manufacturing method of the belt to be described later, the surfactant can be also incorporated into the fiber member by applying the surfactant to a surface of a cylindrical outer mold having a plurality of ribs engraved on the inner circumferential surface thereof and performing molding and vulcanization. Of these, from the viewpoint of capable of easy and homogeneous incorporation (or attachment) of the surfactant, the method of immersion in the surfactant (immersion treatment) is preferred.

In the above method, the surfactant may be incorporated in a form of containing a solvent (i.e., a form of a solution containing the surfactant), if necessary. Such a solvent can be appropriately selected depending on the kind or the like of the surfactant and includes, without particular limitation, general-purpose solvents such as water, hydrocarbons (e.g., aromatic hydrocarbons such as toluene and xylene), ethers (e.g., linear ethers such as diethyl ether; cyclic ethers such as dioxane and tetrahydrofuran), ketones (e.g., linear ketones such as acetone and methyl ethyl ketone; cyclic ketones such as cyclohexanone), esters (e.g., acetic acid esters such as ethyl acetate). These solvents may be used alone or as a mixed solvent.

In the solution containing the surfactant, the concentration of the surfactant may be, for example, from 0.1 to 80% by mass (e.g., from 0.2 to 60% by mass), preferably from 0.3 to 50% by mass (e.g., from 0. 4 to 40% by mass), and more preferably from about 0.5 to 30% by mass, and in particular, may be 1% by mass or more (e.g., from 2 to 50% by mass (e.g., from 3 to 40% by mass), and preferably from 5 to 30% by mass (e.g., from 7 to 25% by mass)). When the concentration is controlled as such, the content of the surfactant to the fiber member can be easily controlled efficiently to the range as described above.

The immersion time is not particularly limited and may be, for example, 1 minute or more (e.g., from 3 minutes to 10 hours), preferably 5 minutes or more (e.g., from 8 minutes to 6 hours), and more preferably about 10 minutes or more (e.g., from 15 minutes to 3 hours). Furthermore, the immersion temperature (immersion treatment temperature) is not particularly limited and may be, for example, from about 10° C. to 60° C. When the temperature is too low, the fluidity of the solution or the surfactant decreases and impregnation properties and workability decrease. When the temperature is too high, the solvent is vaporized and the concentration of the surfactant varies (increases).

After the immersion treatment, if necessary, a drying treatment may be performed. The drying treatment may be performed under heating (e.g., under heating at 50° C. or higher (e.g., from 70 to 200° C.), and preferably about 100° C. or higher (e.g., from 120 to 160° C.). The drying time is not particularly limited and may be, for example, from 10 to 120 minutes. When the drying time is too short, drying becomes insufficient, and when it is too long, the fiber member (in particular, a cellulose fiber such as cotton) is discolored depending on the drying temperature.

(Transmission Belt)

The fiber member of the present invention is useful as a fiber member for covering the surface of the frictional power transmission part (power transmission part) (i.e., the frictional power transmission surface (or power transmission surface)) of a power transmission belt (power transmission belt having a frictional power transmission part). Therefore, the present invention also encompasses a power transmission belt having such a fiber member provided thereon. That is, the power transmission belt of the present invention is a power transmission belt having a frictional power transmission part, in which the surface (frictional power transmission surface) of the frictional power transmission part is covered with the fiber member. The frictional power transmission surface is a surface (ventral surface of the belt) capable of coming into contact with a pulley. Therefore, the frictional power transmission surface can come into contact with the pulley through the fiber member.

The structure of such a power transmission belt is not particularly limited as long as it has a frictional power transmission part but in many cases, for example, at least a compression layer having a frictional power transmission part (or a compression layer that forms a frictional power transmission part) is provided thereon. It is sufficient that such a compression layer is provided with a frictional power transmission part and the overall compression layer may constitute the frictional power transmission part. In such a power transmission belt, in many cases, at least the frictional power transmission part (or frictional power transmission surface) is formed of a rubber (or rubber composition) and the whole compressive layer may be formed of a rubber. In the present invention, even when the frictional power transmission part is formed of a rubber as above, it is possible to ensure high quietness at the time of exposure to water.

A typical power transmission belt contains a tension layer that forms a belt back face (outer circumferential surface of the belt), a compression layer (in particular, a compression rubber layer formed of a rubber) that is formed on one side of the tension layer and has a frictional power transmission part, and a tension member that is embedded along a belt longitudinal direction between the tension layer and the compression layer, in many cases. In the present invention, in such a power transmission belt, the surface (frictional power transmission surface) of the frictional power transmission part constituting the compressive layer is covered (laminated) with the fiber member.

In order to improve the adhesiveness between the tension member and the tension layer or the compression layer, an adhesion layer may be provided between the compression layer and the tension layer if necessary. Furthermore, the tension member is not particularly limited as long as it can be embedded between the tension layer and the compression layer. For example, it may be embedded in the compression layer or may be embedded in the compression layer while being in contact with the tension layer. In the case of providing the adhesion layer, the tension member may be embedded in the adhesion layer or may be embedded between the compression layer and the adhesion layer or the adhesion layer and the tension layer.

The kind of the power transmission belt is not particularly limited and, examples thereof include a V-belt, a V-ribbed belt, a flat belt, and the like. Of these belts, the V-ribbed belt exhibiting high power transmission efficiency is preferred.

Figure 1:
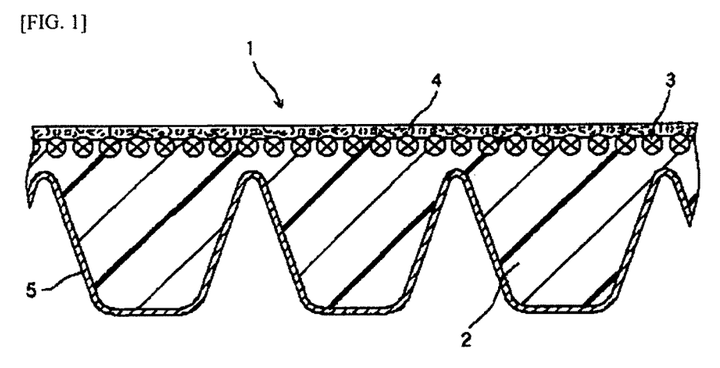
FIG. 1 is a schematic cross-sectional view illustrating an example of a V-ribbed belt of the present invention.

FIG. 1 is a schematic cross-sectional view illustrating an example of a power transmission belt (V-ribbed belt) of the present invention. The belt 1 has a form in which a fiber member 5, a compression layer (compression rubber layer) 2 that is formed of a rubber composition, a tension member 3, and a tension layer 4 composed of a cover canvas (woven fabric, knitted fabric, non-woven fabrics, etc.) are laminated from a belt bottom surface (inner circumferential surface, ventral surface) to a belt top surface (back face) in the order.

In this belt 1, the tension member 3 is embedded along the belt longitudinal direction and a part thereof is in contact with the tension layer 4 and the remaining part is in contact with the compression layer 2.

In the compressed layer 2, a plurality of grooves having a V-shaped cross-section, which extend in the belt longitudinal direction, are formed. A plurality of ribs (three pieces in the example illustrated in FIG. 1) having a V-shaped cross-section (inverted trapezoid) are formed between the grooves, two inclined faces (surface) of the ribs serving as the frictional power transmission part form the frictional power transmission surface and come into contact with the pulley to transmit power (frictional power transmission).

The rib surface (frictional power transmission surface) is covered with the fiber member 5 (knitted fabric or the like).

The power transmission belt of the present invention is not limited to this form. For example, the tension layer 4 may be formed of a rubber composition and an adhesion layer may be provided between the compression layer 2 and the tension layer 4.

The following will describe details of individual layers constituting the belt.

(Compression Layer)

The compression layer may be usually formed of a rubber (or a rubber composition). Examples of the rubber (rubber constituting the rubber composition) include known rubber components and/or elastomers such as diene-based rubbers (natural rubber, isoprene rubber, butadiene rubber, chloroprene rubber, styrene-butadiene rubber (SBR), acrylonitrile-butadiene rubber (nitrile rubber), hydrogenated nitrile rubber (including a mixed polymer of hydrogenated nitrile rubber and an unsaturated carboxylic acid metal salt), etc.), ethylene-α-olefin elastomers, chlorosulfonyl polyethylene rubbers, alkylated chlorosulfonyl polyethylene rubbers, epichlorohydrin rubbers, acrylic rubbers, silicone rubbers, urethane rubbers, fluororubbers, and the like. These polymer components may be used alone or in combination. Of these polymer components, in view of containing no harmful halogen, having ozone resistance, heat resistance, and cold resistance, and also being excellent in economical efficiency, ethylene-α-olefin elastomers (ethylene-α-olefin-based rubbers such as ethylene-propylene rubbers (EPR) and ethylene-propylene-diene rubbers (EPDM, etc.)) are preferred.

The ratio of the rubber to the whole compression layer (or total amount of the rubber composition) may be, for example, 20% by mass or more (e.g., from 25 to 80% by mass), preferably 30% by mass or more (e.g., from 35 to 75% by mass), and further preferably 40% by mass or more (e.g., from 45 to 70% by mass).

The compression layer (or the rubber or the rubber composition forming the compression rubber layer) may contain various additives as required.

Examples of the additives (blending agents) include known additives such as vulcanizing agents or crosslinking agents (e.g., oximes (quinone dioxime, etc.), guanidines (diphenylguanidine, etc.), metal oxides (magnesium oxide, zinc oxide, etc.), organic peroxides (diacyl peroxides, peroxy esters, dialkyl peroxides, etc.), etc.), vulcanization aids, vulcanization accelerators, vulcanization retarders, reinforcing agents (carbon black, silicon oxide such as hydrated silica, etc.), metal oxides (e.g., zinc oxide, magnesium oxide, calcium oxide, barium oxide, iron oxide, copper oxide, titanium oxide, aluminum oxide, etc.), fillers (clay, calcium carbonate, talc, mica, etc.), plasticizers, softeners (oils such as paraffin oils and naphthenic oils), processing agents or processing aids (stearic acid, stearic acid metal salts, waxes, paraffins, etc.), anti-aging agents (aromatic amine-based, benzimidazole-based anti-aging agents, etc.), adhesion improving agents (resorcin-formaldehyde co-condensate, melamine resins such as hexamethoxymethyl-melamine, co-condensates thereof (resorcin-melamine-formaldehyde co-condensates etc.), etc.), colorants, tackifiers, coupling agents (silane coupling agents, etc.), stabilizers (antioxidants, UV absorbers, thermal stabilizers, etc.), lubricants, flame retardants, and antistatic agents, and the like.

These additives may be used alone or in combination and is appropriately selected depending on the kind, use, performance and the like of the rubber and used.

The ratios of the additives can also be appropriately selected depending on the kind and the like of the rubber. For example, the reinforcing agents (carbon black, etc.) may be, relative to 100 parts by mass of the rubber, 10 parts by mass or more (e.g., from 20 to 150 parts by mass), preferably 20 parts by mass or more (e.g., from 25 to 120 parts by mass), and further preferably 30 parts by mass or more (e.g., from 35 to 100 parts by mass), 40 parts by mass or more (e.g., from 50 to 80 parts by mass).

The compression layer may contain or may not contain a surfactant (the compounds exemplified in the above, etc.).

The compression layer (or rubber composition) may contain a short fiber. Examples of the short fiber include short fibers of the fibers exemplified in the section of the fiber (A) (e.g., cellulose-based fibers such as cotton or rayon, polyester-based fibers (PET fibers, etc.), polyamide fibers (fibers of aliphatic polyamides such as polyamide 6, aramid fibers, etc.), etc.). The short fiber may be a water-absorbent fiber. The short fibers may be used alone or in combination of two or more kinds thereof.

The average fiber length of the short fiber may be, for example, from 0.1 to 30 mm (e.g., from 0.2 to 20 mm), preferably from 0.3 to 15 mm, and further preferably from about 0.5 to 5 mm.

These short fibers may be, if necessary, subjected to a surface treatment with a surfactant, a silane coupling agent, an epoxy compound, a diisocyanate compound, or the like.

The ratio of the short fiber may be, relative to 100 parts by mass of the rubber, for example, from 0.5 to 50 parts by mass (e.g., from 1 to 40 parts by mass), and preferably from about 3 to 30 parts by mass (e.g., from 5 to 25 parts by mass).

The thickness of the compression layer (compression rubber layer, etc.) can be appropriately selected depending on the kind and the like of the belt but may be, for example, from 1 to 30 mm, preferably from 1.5 to 25 mm, and further preferably from about 2 to 20 mm.

(Tension Member)

The tension member is not particularly limited and may contain, for example, a synthetic fiber such as a polyester fiber (polyalkylene arylate-based fiber) or a polyamide fiber (aramid fiber, etc.), an inorganic fiber such as carbon fiber, or the like.

As the tension member, use can be usually made of a twisted cord (e.g., plied, single twist, Lang lay, etc.) using a multifilament yarn. The average cord diameter of the tension member (fiber diameter of the twisted cord) may be, for example, from 0.5 to 3 mm, preferably from 0.6 to 2 mm, and more preferably from about 0.7 to 1.5 mm. The tension member may be embedded in the belt longitudinal direction or may further be multiply embedded in parallel at a predetermined pitch in the belt longitudinal direction.

In order to improve the adhesion to a rubber, the tension member may be subjected to various adhesive treatments with an epoxy compound, an isocyanate compound, or the like, as in the case of the short fiber.

(Tension Layer)

The tension layer may be formed of the same rubber composition as in the case of the compression layer, or may be formed of a fabric (reinforcing fabric) such as canvas.

Examples of the reinforcing fabric include fabrics such as woven fabrics, wide-angle canvas, knitted fabrics, and nonwoven fabrics. Of these, woven fabrics that are woven in the form of plain weave, twill weave, or satin weave, wide-angle canvas in which the intersection angle between the warp yarn and the weft yarn is from about 90° to 120°, and knitted fabrics are preferred. As the fibers constituting the reinforcing fabric, the fibers exemplified in the section of the fiber member (water-absorbent fibers, non-water-absorbent fibers, etc.) can be utilized.

The reinforcing fabric may be subjected to an adhesive treatment (e.g., the adhesion treatment as exemplified in the section of fiber member). Furthermore, after the adhesive treatment (treatment (immersion treatment, etc.) with the RFL solution), it may be further subjected to friction in which a rubber composition is rubbed therein or lamination (coating), to form a canvas with a rubber.

In the case where the tension layer is formed of a rubber (rubber composition), as the rubber component in the rubber composition constituting the tension layer, the same line or the same kind of rubber as the rubber component of the rubber composition of the compression layer is used in many cases. In addition, the ratios of the each additive such as the vulcanizing agent or the cross-linking agent, the co-cross-linking agent or the vulcanization aid, and the vulcanization accelerator can be also selected from the same ranges as in the case of the rubber composition of the compression layer.

The rubber composition may contain the same short fiber as in the compression layer, in order to suppress the generation of noise owing to sticking of the back face rubber during back face driving. The short fiber may be randomly oriented in the rubber composition. Further, the short fiber may be a partially bent short fiber.

In order to suppress the generation of the noise during back face driving, an uneven pattern may be provided on the surface (belt back surface) of the tension layer. Examples of the uneven pattern include a knitted fabric pattern, a woven fabric pattern, a cord woven fabric pattern, an embossed pattern, and the like. Of these patterns, the woven fabric pattern and the embossed pattern are preferred. Furthermore, at least a part of the back face of the tension layer may be covered with a fiber-resin mixture layer.

The thickness of the tension layer can be appropriately selected depending on the kind and the like of the belt, but may be, for example, from 0.5 to 10 mm, preferably from 0.7 to 8 mm, and further preferably from about 1 to 5 mm.

(Adhesion Layer)

The adhesion layer is, as described above, not necessarily required. The adhesion layer (adhesion rubber layer) can be configured with, for example, the same rubber composition (rubber composition containing a rubber component such as ethylene-α-olefin elastomer) as in the case of the compression layer (compression rubber layer). In the rubber composition of the adhesion layer, as the rubber component, the same line or the same kind of rubber as the rubber component in the rubber composition of the compression rubber layer is used in many cases. In addition, the ratios of the each additive such as the vulcanizing agent or the cross-linking agent, the co-crosslinking agent or the vulcanization aid, and the vulcanization accelerator can be also selected from the same ranges as in the case of the rubber composition of the compression layer. The rubber composition of the adhesion layer may further contain an adhesion improving agent (resorcin-formaldehyde co-condensation product, an amino resin, etc.).

The thickness of the adhesion layer can be appropriately selected depending on the kind and the like of the belt, but may be, for example, from 0.2 to 5 mm, preferably from 0.3 to 3 mm, and further preferably from about 0.5 to 2 mm.

The power transmission belt of the present invention is, as described above, excellent in silence, in particular, silence at the time of exposure to water. As for such excellent silence, the contact angle of water on the frictional power transmission surface can be taken as one index. For example, a contact angle (contact angle between the surface of the frictional power transmission part and water) after the elapse of 5 seconds from dropwise addition of water on the surface of the frictional power transmission surface of the power transmission belt of the present invention may be 50° or less, preferably 40° or less, and more preferably 30° or less, and particularly, can be controlled to 0° (or approximately 0°).

A method for manufacturing the power transmission belt of the present invention is not particularly limited, and known or conventional methods can be employed. For example, the belt can be formed by laminating a fiber member, a compression layer composed of a rubber (or rubber composition), a tension member, and a tension layer, molding the resulting laminate cylindrically in a molding mold, vulcanizing it to form a sleeve, and cutting the vulcanized sleeve into a predetermined width.

More particularly, a V-ribbed belt can be manufactured, for example, by the following method.

(First Manufacturing Method)

First, a cylindrical inner mold having a flexible jacket mounted on the outer circumferential surface thereof is used as an inner mold. An unvulcanized sheet for a tension layer is wound on the flexible jacket on the outer circumferential surface, a tension member is helically spun on the sheet, and further, thereon are wound an unvulcanized sheet for a compression layer and a fiber member to prepare a laminate. Then, a cylindrical outer mold where a plurality of rib molds are engraved on the inner circumferential surface thereof is used as an outer mold capable of being mounted on the inner mold. The inner mold on which the laminate has been wound is concentrically set in the outer mold. Thereafter, the flexible jacket is expanded toward the inner circumferential surface (rib molds) of the outer mold and the laminate (compression layer) is press-fitted to the rib molds, followed by vulcanization. Then, after the inner mold is taken out from the outer mold and the vulcanized rubber sleeve having a plurality of ribs is released from the outer mold, the vulcanized rubber sleeve is cut into a predetermined width along a belt longitudinal direction by using a cutter to finally form a V-ribbed belt. In this first manufacturing method, the sleeve (or V-ribbed belt) having a plurality of ribs can be finally formed at once by expanding the laminate having the tension layer, the tension member, and the compression layer.

(Second Manufacturing Method)

In connection with the first manufacturing method, for example, there may be adopted the method disclosed in JP-A-2004-82702 (a method in which only a compression layer is expanded to form a preform (semi-vulcanized state), then a tension layer and a tension member are expanded and press-bonded to the preform, and they are vulcanized and integrated to finally form a V-ribbed belt).

EXAMPLES

The following will explain the present invention in more detail based on Examples, but the present invention is not limited to these Examples. Incidentally, the followings show the measurement method of the attached amount of surfactants, and measurement methods or evaluation methods of individual properties.

(Attached Amount of Surfactant)

The mass of a fiber member and the mass of a belt were measured before and after the treatment with a surfactant and before and after vulcanization, and from the following equation, the attached amount (content) $W_N$ (g/m²) of the surfactant per 1 m² of the fiber member before vulcanization and the attached amount (content) $W_R$ (g/m²) of the surfactant per 1 m² of the fiber member after vulcanization were determined.

$$W_N = (N_2 - N_1)/S_N (g/m^2)$$

$$W_R = (R_2 - R_1)/S_R (g/m^2)$$

(in the formulae, $N_1$ represents the mass of the fiber member (main body of the fiber member) before the attaching treatment, $N_2$ represents the mass of the fiber member after the attaching treatment, $S_N$ represents the area of the fiber member, $R_1$ represents the mass of the belt after vulcanization, which was not subjected to the attaching treatment, $R_2$ is the mass of the belt after vulcanization, which was subjected to the attaching treatment, and $S_R$ represents the area of the fiber member in the belt).

Also, from the basis weight of the fiber member, the attached amount (parts by mass) of the surfactant per 100 parts by mass of the fiber (A) (or the main body of the fiber member) was determined.

(Contact Angle)

Figure 2:
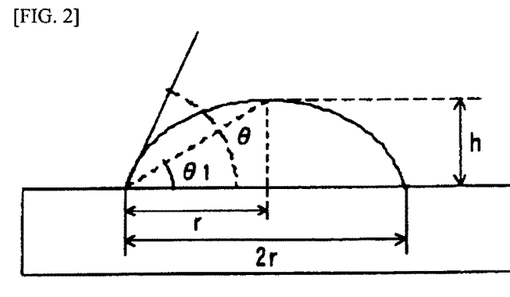
FIG. 2 is a conceptual diagram for explaining a method of measuring a contact angle in Examples.

The contact angle θ between the frictional power transmission surface of the belt and water (the angle formed by the tangent line in the end point of the water droplet with the frictional power transmission surface) can be determined from the projection photograph of a water droplet when water is added dropwise to the frictional power transmission surface, as illustrated in FIG. 2, from the following equation using the θ/2 method.

$$\theta = 2\theta_1 \quad (1)$$

$$\tan\theta_1 = h/r \rightarrow \theta_1 = \tan^{-1}(h/r) \quad (2)$$

(in the equations, $\theta_1$ is the angle of a straight line connecting the vertex with the end point of the water droplet (left end point in FIG. 2) with respect to the frictional power transmission surface, h represents the height of the water droplet, and r represents the radius of the water droplet).

When the equation (2) is substituted into the equation (1), the following equation (3) is obtained.

$$\theta = 2\tan^{-1}(h/r) \quad (3)$$

As for the measurement, under room temperature (25° C.) conditions, r and h were measured from the projection photograph of the dropped water droplet by using a full automatic contact angle meter (CA-W type, manufactured by Kyowa Interface Science Co., Ltd.) and the contact angle was calculated by using the equation (3). In the measurement, the contact angle immediately after dropwise addition (after 5 seconds) was calculated. The smaller contact angle θ indicates that the frictional power transmission surface is more excellent in affinity to water. In particular, the fact that the contact angle θ becomes 0° indicates that the water droplet is spread all over the contact surface.

(Friction Coefficient (SAE μ method))

Figure 3:
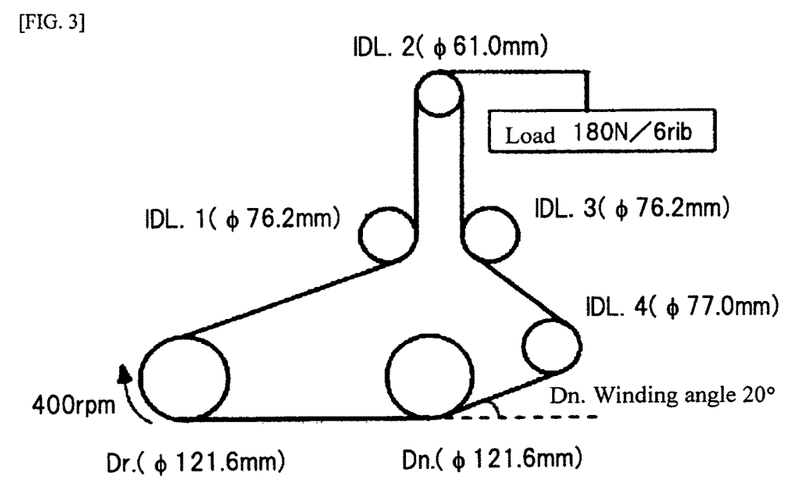
FIG. 3 is a conceptual diagram for explaining a method of measuring a friction coefficient in Examples.

For measuring the friction coefficient at an ordinary running (DRY), as illustrated in the layout in FIG. 3, used was a test machine in which a driving pulley (Dr.) having a diameter of 121.6 mm, an idler pulley (IDL. 1) having a diameter of 76.2 mm, an idler pulley (IDL. 2) having a diameter of 61.0 mm, an idler pulley (IDL. 3) having a diameter of 76.2 mm, an idler pulley (IDL. 4) having a diameter of 77.0 mm, and a driven pulley (Dn.) having a diameter of 121.6 mm were disposed in the order.

Namely, a V-ribbed belt was stretched around individual pulleys of the test machine, and the belt was made traveling under room temperature (25° C.) conditions while controlling the number of rotations of the driving pulley to 400 rpm, controlling the belt winding angle to the driven pulley to 20°, and imparting a constant load [180 N/6 Rib], and then, the torque of the driven pulley was increased from 0 to at most 20 Nm. Thus, the friction coefficient μ was determined by using the following equation from the torque value of the driven pulley at the time when the slip velocity of the belt against the driven pulley reached maximum (100% slip):

$$\mu = \ln(T1/T2)/\alpha$$

Here, T1 is a tight-side tension, T2 is a slack-side tension, and α is a belt winding angle to the driven pulley. They can be calculated according to the following equations.

$$T1 = T2 + Dn.\text{torque (kgf·m)}/(121.6/2000)$$

$$T2 = 180(N/6 \text{ Rib})$$

$$\alpha = \pi/9 \text{ (rad) (in the equation, rad means radian)}$$

Figure 4:
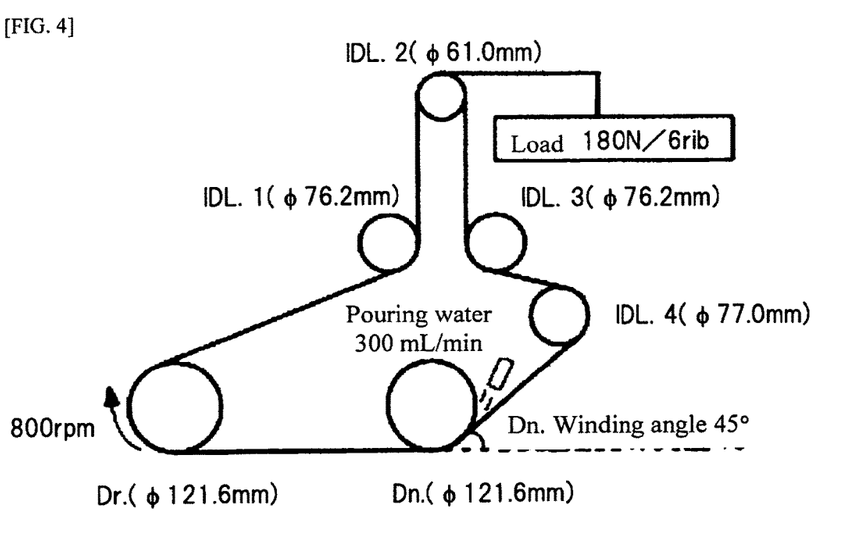
FIG. 4 is a conceptual diagram for explaining a method of measuring a friction coefficient in Examples (at the time of pouring water).

For the measurement of the friction coefficient at a running under pouring water (WET), a test machine whose layout is illustrated in FIG. 4 was used. Namely, the same test machine as in the ordinary running was used except that the number of rotations of the driving pulley was controlled to 800 rpm and the belt winding angle to the driven pulley was controlled to 45° ($\alpha = \pi/4$), and water was continuously poured to the vicinity of the inlet of the driven pulley in a rate of 300 ml per minute. The friction coefficient μ was also determined similarly by using the above equations.

(Durability Test (High-temperature and Low-tension Reverse Bending Test))

Figure 5:
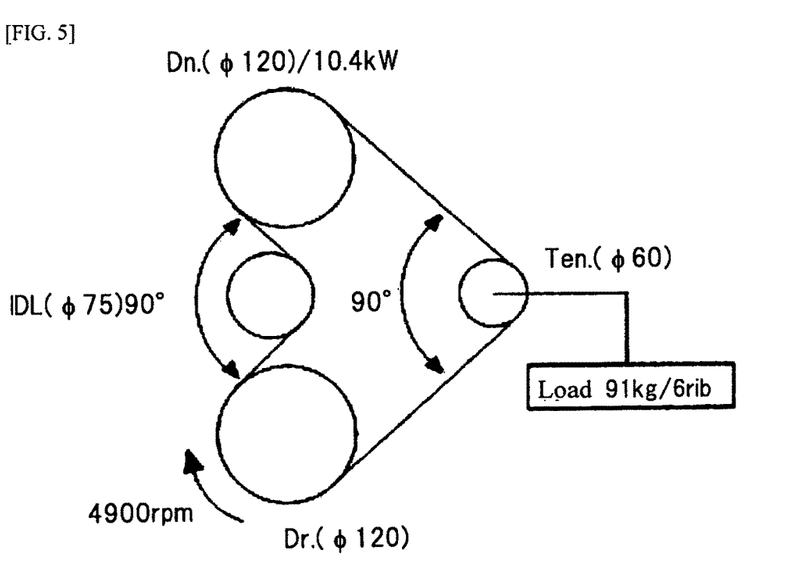
FIG. 5 is a conceptual diagram for explaining a durability test in Examples.

A high-temperature and low-tension reverse bending test was carried out, as illustrated in the layout in FIG. 5, by using a test machine in which a driving pulley (Dr.) having a diameter of 120 mm, an idler pulley (IDL.) having a diameter of 75 mm, a driven pulley (Dn.) having a diameter of 120 mm, and a tension pulley (Ten.) having a diameter of 60 mm were disposed in the order. That is, a V-ribbed belt was stretched around individual pulleys of the test machine and the belt was made traveling at an atmospheric temperature of 120° C. while controlling the number of rotations of the driving pulley to 4900 rpm, controlling the belt winding angle to the idler pulley and the tension pulley to 90°, controlling the driven pulley load to 10.4 kW, and imparting a constant load [91 kg/6 Rib].

The traveling time was interrupted at 300 hours, and the durability of the belt was evaluated according to the following criteria.

S: Crack is not generated at 300 hours

A: One to five cracks are generated at 300 hours

B: Six or more cracks (one or more cracks per rib on average) are generated at 300 hours (Noise Generation Resistance)

Figure 6:
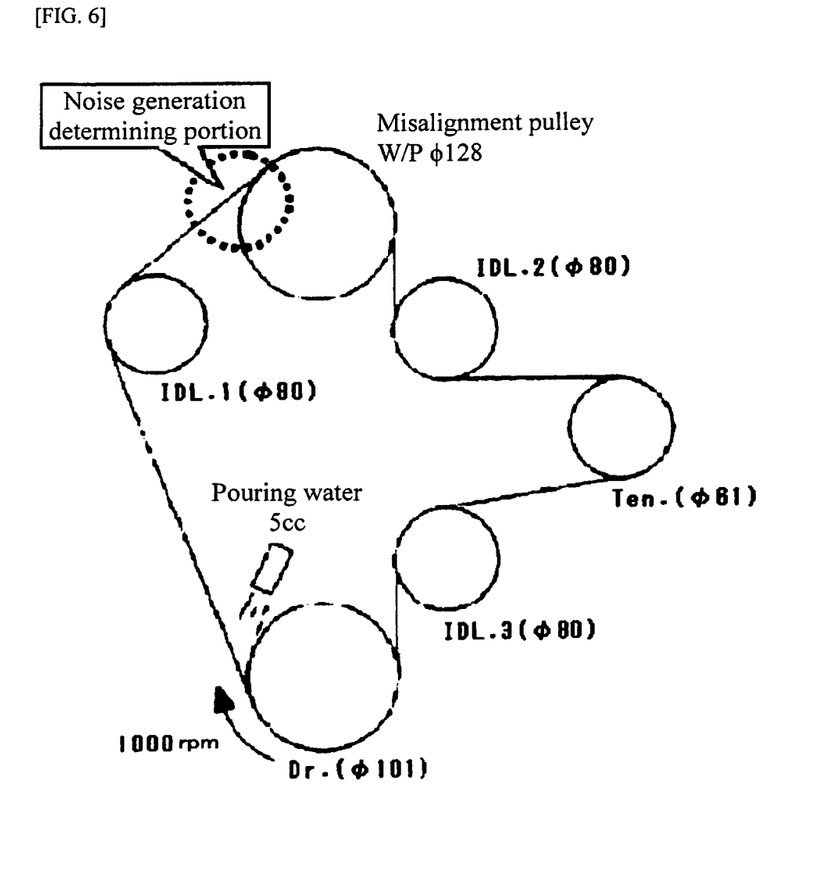
FIG. 6 is a conceptual diagram for explaining a test for evaluating misalignment noise generation in Examples.

For the test for evaluating misalignment noise generation (noise generation limit angle), as illustrated in the layout in FIG. 6, used was a test machine in which a driving pulley (Dr.) having a diameter of 101 mm, an idler pulley (IDL. 1) having a diameter of 80 mm, a misalignment pulley (W/P) having a diameter of 128 mm, an idler pulley (IDL. 2) having a diameter of 80 mm, a tension pulley (Ten.) having a diameter of 61 mm, and an idler pulley (IDL. 3) having a diameter of 80 mm were disposed in the order. The span between the shafts (span length) of the idler pulley (IDL. 1) and the misalignment pulley was set at 135 mm, and adjustment was performed so that all the pulleys were positioned on the same plane (angle of misalignment:0°).

That is, a V-ribbed belt was stretched around individual pulleys of the test machine. The belt was made traveling under room temperature (25° C.) conditions, while the number of rotations of the driving pulley was controlled to 1000 rpm, tension was imparted so that the belt tension was controlled to 50 N/Rib, and 5 cc of water was poured to the frictional power transmission surface of the V-ribbed belt periodically (at intervals of about 30 seconds) in the vicinity of the outlet of the driving pulley. On this occasion, the misalignment pulley was moved to the front side relative to the other pulleys, and then an angle (noise generation limit angle) at the time when noise was generated in the vicinity of the inlet of the misalignment pulley was determined. The larger noise generation limit angle indicates that the quietness is more excellent, and judgment was performed according to the following criteria.

S: No noise generation until rib misaligned (quietness is extremely good)

A: Noise generation angle is 2° or more and less than 3° (quietness is good)

B: Noise generation angle is less than 2° (quietness is bad)

Normally, the belt comes off the pulley at around 3° (i.e., rib misaligned) to enter a state that power is not normally transmitted.

(Rubber Composition)

Each of the rubber compositions A to D shown in Table 1 was kneaded in a Banbury mixer and the kneaded rubber was passed through a calender roll to prepare an unvulcanized rolled rubber sheet (sheet for a compression layer) having a predetermined thickness.

Also, by using the rubber composition A shown in Table 1, a sheet for a tension layer was prepared in the same manner as described above.

The ratio of each component in the rubber composition shown in Table 1 is indicated as parts by mass. The components of the rubber composition are as follows.

EPDM: "NORDEL IP4640", manufactured by Dow Chemical Co., Ltd.

Zinc oxide: "Zinc Oxide III", manufactured by Seido Chemical Industry Co., Ltd.

Carbon black: "SEAST V", average particle diameter 55 nm, manufactured by Tokai Carbon Co., Ltd.

Softener: paraffinic oil, "NS-90", manufactured by Idemitsu Kosan Co., Ltd.

Anti-aging agent: "Nocrac MB", manufactured by Ouchi Shinko Chemical Industrial Co., Ltd.

Organic peroxides: "Percumyl D-40", manufactured by NOF Corporation.

Co-crosslinking agent: "Vulnoc PM", manufactured by Ouchi Shinko Chemical Industrial Co., Ltd.

Cotton short fibers: denim, average fiber diameter of 13 μm, the average fiber length of 3 mm Nylon short fibers: Nylon 66, average fiber diameter of 27 μm, the average fiber length of 3 mm Surfactant: polyoxyalkylene alkyl ether, "Emulgen", manufactured by Kao Corporation.

TABLE 1

| Component (parts by mass) | Kind of rubber composition | | | |
| --- | --- | --- | --- | --- |
| | A | B | C | D |
| EPDM | 100 | 100 | 100 | 100 |
| Zinc oxide | 5 | 5 | 5 | 5 |
| Stearic acid | 1 | 1 | 1 | 1 |
| Carbon black | 60 | 60 | 60 | 60 |
| Softener | 5 | 5 | 5 | 5 |
| Anti-aging agent | 2 | 2 | 2 | 2 |
| Organic peroxide | 5 | 5 | 5 | 5 |
| Co-crosslinking agent | 2 | 2 | 2 | 2 |
| Cotton short fiber | — | 20 | 0 | 20 |
| Nylon short fiber | — | 0 | 20 | 0 |
| Surfactant | — | 10 | 10 | 0 |

(Fiber Member)

Examples 1 to 9 and Comparative Examples 1 to 2 and 6

By using the yarns described below as knitting yarns, weft knitted fabrics (basis weight: 170 g/m$^2$, thickness: 0.55 mm) in which the tissue was jersey stitch were prepared.

First yarn (yarn containing a water-absorbent fiber): a covering yarn in which a core yarn of polyurethane (PU) was covered with cotton, thickness: a count of 50

Second yarn (yarn made of non-water-absorbent fibers alone): a covering yarn in which a core yarn of polyurethane (PU) was covered with polyethylene terephthalate (PET), thickness: 56 dtex Weft knitted fabrics were prepared in the same manner by using a cotton yarn alone as the knitting yarn in Example 5 and by using the second yarn alone as the knitting yarn in Comparative Examples 2 and 6. The ratio of the cotton fiber (water-absorbent fiber) and the fiber(s) other than the cotton fiber (stretchable non-water-absorbent fibers, etc.) to the whole fibers constituting the knitted fabric (fiber member) is as shown in Tables 2 to 4.

Of these knitted fabrics, for Examples 1 to 9 and Comparative Example 2, they were further subjected to an attaching treatment with a surfactant. The attaching treatment was performed by immersing each of the knitted fabrics in a toluene solution containing the surfactant at a concentration shown in Table 2 at room temperature (25° C.) for 30 minutes and drying it at 143° C. for 10 minutes in an oven.

As the surfactant, the following nonionic surfactant (hereinafter, simply referred to as "Nonion 1") was used.

"Nonion 1": a polyoxyalkylene alkyl ether (trade name "Emulgen", manufactured by Kao Corporation)

Examples 10 and 11

Fiber members were prepared in the same manner as in Example 4 and Example 7 except that the following nonionic surfactant (hereinafter, simply referred to as "Nonion 2") was used in place of the surfactant in Example 4 and Example 7.

"Nonion 2": polyoxyethylene tridecyl ether (trade name "Pegnol", manufactured by Toho Chemical Co., Ltd.)

Example 12

A fiber member was prepared in the same manner as in Example 7 except that the following anionic surfactant (hereinafter, simply referred to as "Ion") was used in place of the surfactant in Example 7.

"Ion": aliphatic phosphoric acid ester (trade name "ADEKA COL PS", manufactured by Adeka Corporation)

Example 13

A fiber member was prepared in the same manner as in Example 2 except that a weft knitted fabric was prepared by using another water-absorbent fiber (a covering yarn (Rayon yarn) in which a core yarn of polyurethane (PU) was covered with rayon, a thickness of 30 (dtex)) was used in place of the first yarn (water-absorbent fiber) (covering yarn in which a core yarn of polyurethane (PU) was covered with cotton, thickness: a count of 50) in Example 2.

Example 14

A fiber member was prepared in the same manner as in Example 2 except that a warp knitting fabric was prepared by using the first yarn (water-absorbent fiber) and the second yarn (non-water-absorbent fiber) in Example 2. Incidentally, the knitted structure of the warp knitted fabric is single denbigh (a single layer warp knitting fabric).

(Preparation of Belt)

A cylindrical inner mold having a flexible jacket mounted on the outer circumferential surface thereof was used as an inner mold. An unvulcanized sheet for a tension layer was wound on the flexible jacket on the outer circumferential surface, a tension member was helically spun on this sheet, and an unvulcanized sheet for a compression layer and a fiber member (knitted fabric) shown in Tables 2 to 4 were wound further thereon in this order to prepare a laminate.

As the tension member, a polyester cord of 1100 dtex/2×3 configuration was used. In order to improve the adhesion to a rubber, the cord was subjected to an immersion treatment in a resorcin-formalin-latex solution (RFL liquid) and then subjected to a coating treatment with a treating solution prepared by dissolving a rubber composition containing EPDM in an organic solvent (toluene).

In Comparative Examples 3 to 5, laminates were prepared without winding a fiber member.

Then, a cylindrical outer mold having a plurality of ribs engraved on an inner circumferential surface thereof was used as an outer mold capable of being mounted on the inner mold and, in the outer mold, the inner mold on which the laminate had been wound was concentrically set. Thereafter, the flexible jacket was expanded toward the inner circumferential surface (rib molds) of the outer mold and the laminate (compression layer) was press-fitted to the rib molds, followed by vulcanization. Then, after the inner mold was taken out from the outer mold and the vulcanized rubber sleeve having a plurality of ribs was released from the outer mold, the vulcanized rubber sleeve was cut into a predetermined width along a belt longitudinal direction by using a cutter to obtain a V-ribbed belt (a rib number of 6, a circumferential length of 1200 mm).

Then, the obtained belt was subjected to various measurements and evaluations. The results are shown in Tables 2 to 4. Incidentally, as for the "noise generation limit angle" in Tables 2 to 4, "None" means that noise was not generated until rib misaligned.

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Kind of rubber composition for compressive layer | | A | A | A | A | A | A | A |
| Fiber member | | Present | Present | Present | Present | Present | Present | Present |
| Knitting method | | Weft knitting | Weft knitting | Weft knitting | Weft knitting | Weft knitting | Weft knitting | Weft knitting |
| Kind of water-absorbent fiber | | Cotton | Cotton | Cotton | Cotton | Cotton | Cotton | Cotton |
| Water-absorbent fiber/other fiber (mass ratio) | | 20/80 | 30/70 | 80/20 | 95/5 | 100/0 | 15/85 | 95/5 |
| Kind of surfactant | | Nonion 1 | Nonion 1 | Nonion 1 | Nonion 1 | Nonion 1 | Nonion 1 | Nonion 1 |
| Attaching treatment of surfactant | | Yes | Yes | Yes | Yes | Yes | Yes | Yes |
| Surfactant concentration (% by mass) | | 10% | 10% | 10% | 10% | 10% | 10% | 0.5% |
| Attached amount before vulcanization | per $m^2$ of fiber member (g) | 26.6 | 26.6 | 26.6 | 26.6 | 26.6 | 26.6 | 2.1 |
| | per 100 parts by mass of fiber member (parts by mass) | 15.6 | 15.6 | 15.6 | 15.6 | 15.6 | 15.6 | 1.3 |
| Attached amount after vulcanization | per $m^2$ of fiber member (g) | 17.7 | 17.7 | 17.7 | 17.7 | 17.7 | 17.7 | 1.6 |
| | per 100 parts by mass of fiber member (parts by mass) | 10.4 | 10.4 | 10.4 | 10.4 | 10.4 | 10.4 | 0.9 |
| | Contact angle (°) | 0° | 0° | 0° | 0° | 0° | 0° | 26° |
| | Friction coefficient DRY | 1.1 | 1.1 | 1.1 | 1.1 | 1.1 | 1.1 | 1.0 |
| | Friction coefficient WET | 1.1 | 1.0 | 1.2 | 1.2 | 1.2 | 0.7 | 1.1 |
| | Durability test | S | S | S | S | A | S | S |
| Noise generation resistance | Noise generation limit angle (°) | 2.5 | None | None | None | None | 2.2 | 2.5 |
| | Evaluation | A | S | S | S | S | A | A |

TABLE 3

| | | Ex. 8 | Ex. 9 | Ex. 10 | Ex. 11 | Ex. 12 | Ex. 13 | Ex. 14 |
|---|---|---|---|---|---|---|---|---|
| Kind of rubber composition for compressive layer | | A | A | A | A | A | A | A |
| Fiber member | | Present | Present | Present | Present | Present | Present | Present |
| Knitting method | | Weft knitting | Weft knitting | Weft knitting | Weft knitting | Weft knitting | Weft knitting | Warp knitting |
| Kind of water-absorbent fiber | | Cotton | Cotton | Cotton | Cotton | Cotton | Rayon | Cotton |
| Water-absorbent fiber/other fiber (mass ratio) | | 95/5 | 95/5 | 95/5 | 95/5 | 95/5 | 30/70 | 30/70 |
| Kind of surfactant | | Nonion 1 | Nonion 1 | Nonion 2 | Nonion 2 | Ion | Nonion 1 | Nonion 1 |
| Attaching treatment of surfactant | | Yes | Yes | Yes | Yes | Yes | Yes | Yes |
| Surfactant concentration (% by mass) | | 20% | 30% | 10% | 0.5% | 0.5% | 10% | 10% |
| Attached amount before vulcanization | per $m^2$ of fiber member (g) | 50.9 | 77.8 | 24.5 | 2.0 | 2.1 | 26.6 | 22.8 |
| | per 100 parts by mass of fiber member (parts by mass) | 30.0 | 45.8 | 14.4 | 1.2 | 1.3 | 15.6 | 13.4 |
| Attached amount after vulcanization | per $m^2$ of fiber member (g) | 41.4 | 63.3 | 16.3 | 1.5 | 1.6 | 17.7 | 15.2 |
| | per 100 parts by mass of fiber member (parts by mass) | 24.4 | 37.2 | 9.6 | 0.9 | 0.9 | 10.4 | 8.9 |
| | Contact angle (°) | 0° | 0° | 0° | 28° | 70° | 0° | 0° |
| | Friction coefficient DRY | 0.9 | 0.9 | 1.1 | 1.0 | 0.9 | 1.0 | 1.0 |
| | Friction coefficient WET | 1.1 | 1.1 | 1.1 | 1.1 | 1.1 | 0.7 | 0.8 |
| | Durability test | S | S | S | S | S | S | S |
| Noise generation resistance | Noise generation limit angle (°) | None | 2.8 | None | 2.4 | 2.2 | 2.3 | 2.9 |
| | Evaluation | S | A | S | A | A | A | A |

TABLE 4

| | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Kind of rubber composition for compressive layer | A | A | B | C | D | A |
| Fiber member | Present | Present | Absent | Absent | Absent | Present |
| Knitting method | Weft knitting | Weft knitting | — | — | — | Weft knitting |
| Kind of water-absorbent fiber | Cotton | — | — | — | — | — |
| Water-absorbent fiber/other fiber (mass ratio) | 95/5 | 0 | — | — | — | 0 |
| Kind of surfactant | — | Nonion 1 | — | — | — | — |
| Attaching treatment of surfactant | No | Yes | — | — | — | No |
| Surfactant concentration (% by mass) | — | 10% | — | — | — | — |

TABLE 4-continued

|  |  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- |
| Attached amount before vulcanization | per m$^2$ of fiber member (g) | — | 10.22 | — | — | — | — |
|  | per 100 parts by mass of fiber member (parts by mass) |  | 6.00 |  |  |  |  |
| Attached amount after vulcanization | per m$^2$ of fiber member (g) | — | 6.8 | — | — | — | — |
|  | per 100 parts by mass of fiber member (parts by mass) |  | 4.00 |  |  |  |  |
|  | Contact angle (°) | 120° | 0° | 90° | 100° | 130° | 130° |
|  | Friction coefficient DRY | 1.1 | 1.0 | 0.7 | 0.7 | 0.8 | 1.1 |
|  | Friction coefficient WET | 1.0 | 0.5 | 0.5 | 0.4 | 0.4 | 0.5 |
|  | Durability test | S | S | S | S | S | S |
| Noise generation resistance | Noise generation limit angle (°) | 1.9 | 1.8 | 2.1 | 2.0 | 1.5 | 1.5 |
|  | Evaluation | B | B | A | A | B | B |

As is evident from the results of Tables 2 to 4, in Examples, the contact angle was relatively small, the friction coefficient was moderately maintained at both DRY and WET, a difference between them was also small, and the noise generation resistance (silence) was good. Also, the durability was good.

In particular, among Examples, when a water-absorbent fiber and a non-water-absorbent fiber were combined and also the attached ratio of a surfactant was controlled in the fiber member, it was possible to achieve both of quietness and durability at high levels.

On the other hand, in Comparative Example 1 in which the fiber member did not contain a surfactant, probably because the contact angle with water was as large as 120° and water absorption was not efficiently achieved, noise was generated at the time of exposure to water. In Comparative Example 2 in which the fiber member contained a surfactant but contained no water-absorbent fiber, the contact angle with water was 0° and the wettability was improved but water was not absorbed, so that a decrease in the friction coefficient and noise generation occurred at the time of exposure to water.

In Comparative Examples 3 and 4, although a surfactant and a short fiber were blended in the rubber composition for forming a frictional power transmission part, the contact angle with water became large and the friction coefficient became small at both DRY and WET.

Furthermore, in Comparative Example 5 in which the rubber composition for forming a frictional power transmission surface contained a water-absorbent short fiber but no surfactant, the contact angle with water was as large as 130° and thus wettability was poor, so that water absorption efficiency was low and noise was generated at the time of exposure to water. Furthermore, in Comparative Example 6 in which the fiber member containing no water-absorbent fiber and no surfactant was used, the friction coefficient was large and transmissibility was good as compared with the case where the frictional power transmission surface is composed of a rubber but, since the wettability with water and the water absorbability were poor, noise was generated at the time of exposure to water.

While the present invention has been described in detail and with reference to specific embodiments thereof, it will be apparent to one skilled in the art that various changes and modifications can be made therein without departing from the spirit and scope thereof.

The present application is based on Japanese Patent Application No. 2013-135464 filed on Jun. 27, 2013, Japanese Patent Application No. 2014-062332 filed on Mar. 25, 2014, and Japanese Patent Application No. 2014-125910 filed on Jun. 19, 2014, and the contents are incorporated herein by reference.

INDUSTRIAL APPLICABILITY

The power transmission belt of the present invention can be utilized as a frictional power transmission belt such as a flat belt, a V-belt, and a V-ribbed belt. Moreover, since quietness at the time of exposure to water can be improved, the power transmission belt of the present invention can be suitably used in high-load power transmission equipments to be used outdoors, such as automobiles, motorcycles, and agricultural machines.

DESCRIPTION OF REFERENCE NUMERALS AND SIGNS 1 power transmission belt (V-ribbed belt)
2 compression layer
3 tension member
4 tension layer
5 fiber member

The invention claimed is:

1. A power transmission belt comprising a frictional power transmission part and a fiber member that covers a surface of the frictional power transmission part, wherein the fiber member includes a main body formed of a fiber (A) comprising a water-absorbent fiber (A1) and a nonionic surfactant attached to the main body, wherein a melting point of the nonionic surfactant is 20° C. or lower.

2. The power transmission belt according to claim 1, wherein the water-absorbent fiber (A1) comprises a cellulose-based fiber.

3. The power transmission belt according to claim 1, wherein the water-absorbent fiber (A1) comprises a cotton fiber.

4. The power transmission belt according to claim 1, wherein the water-absorbent fiber (A1) has a proportion of 1% by mass or more in the entire fiber (A).

5. The power transmission belt according to claim 1, wherein the fiber (A) further comprises a non-water-absorbent fiber (A2).

6. The power transmission belt according to claim 5, wherein the non-water-absorbent fiber (A2) comprises a stretchable fiber.

7. The power transmission belt according to claim 5, wherein the water-absorbent fiber (A1) and the non-water-absorbent fiber (A2) has a ratio of the former/the latter (mass ratio)=99/1 to 5/95.

8. The power transmission belt according to claim 1, wherein the fiber member is a knitted fabric.

9. The power transmission belt according to claim 1, wherein the fiber member is a knitted fabric that is knitted by weft knitting.

10. The power transmission belt according to claim 1, wherein the surfactant has a content of from 1 to 100 g per 1 m² of the fiber member.

11. The power transmission belt according to claim 1, wherein the frictional power transmission part is formed of a rubber.

12. The power transmission belt according to claim 1, wherein the power transmission belt further comprises a tension layer that forms a belt back face, a compression layer formed on one side of the tension layer, and a tension member embedded along a belt longitudinal direction between the tension layer and the compression layer and the compression layer has the frictional power transmission part.

13. The power transmission belt according to claim 1, which is a V-ribbed belt.

14. The power transmission belt according to claim 1, wherein the frictional power transmission part has a contact angle of from 0 to 30°, after a lapse of 5 seconds from dropwise addition of water onto its surface.

15. The power transmission belt according to claim 1, wherein the nonionic surfactant is a polyethylene glycol-type surfactant.

16. A fiber member for covering a surface of a frictional power transmission part constituting a power transmission belt, wherein the fiber member includes a main body formed of a fiber (A) comprising a water-absorbent fiber (A1) and a nonionic surfactant attached to the main body, wherein a melting point of the nonionic surfactant is 20° C. or lower.

17. The fiber member according to claim 16, wherein the nonionic surfactant is a polyethylene glycol-type surfactant.

18. A method for manufacturing the fiber member described in claim 16, which comprises a step of immersing the main body of the fiber member formed of the fiber (A) containing the water-absorbent fiber (A1) in a solution containing the surfactant.

19. The manufacturing method according to claim 18, wherein the solution has a concentration of the surfactant of from 0.3 to 50% by mass.

20. The manufacturing method according to claim 18, wherein the nonionic surfactant is a polyethylene glycol-type surfactant.

* * * * *